(12) United States Patent
Kemme et al.

(10) Patent No.: US 9,908,066 B2
(45) Date of Patent: Mar. 6, 2018

(54) DEFOAMER ASSEMBLY FOR USE WITH A FILLER AND METHOD THEREFOR

(71) Applicant: Fogg Filler Company, Holland, MI (US)

(72) Inventors: Todd Kemme, Jenison, MI (US); Darren McIntire, Hamilton, MI (US)

(73) Assignee: Fogg Filler Company, Holland, MI (US)

( * ) Notice: Subject to any disclaimer, the term of this patent is extended or adjusted under 35 U.S.C. 154(b) by 311 days.

(21) Appl. No.: 14/731,981

(22) Filed: Jun. 5, 2015

(65) Prior Publication Data

US 2016/0354710 A1 Dec. 8, 2016

(51) Int. Cl.
*B01D 19/00* (2006.01)
*B01D 19/02* (2006.01)
*B67C 3/22* (2006.01)

(52) U.S. Cl.
CPC ......... *B01D 19/02* (2013.01); *B01D 19/0031* (2013.01); *B67C 3/22* (2013.01)

(58) Field of Classification Search
CPC ..... B01D 19/00; B01D 19/02; B01D 19/0031
USPC .......................................... 96/155, 176, 179
See application file for complete search history.

(56) References Cited

U.S. PATENT DOCUMENTS

| | | | |
|---|---|---|---|
| 1,389,101 A | * | 8/1921 | Ohrvall ............ B01D 19/0047 55/318 |
| 1,984,789 A | | 12/1934 | Everett |
| 2,349,780 A | | 5/1944 | Weinreich et al. |
| 2,639,851 A | | 5/1953 | Duncan |
| 2,669,539 A | | 2/1954 | Ditman |
| 2,672,420 A | | 3/1954 | Jeremiah |
| 3,057,786 A | * | 10/1962 | Waddill ................... B01J 4/001 159/2.1 |
| 3,415,294 A | | 12/1968 | Kelly |
| 3,561,503 A | | 2/1971 | Rogge |
| 4,058,481 A | | 11/1977 | Futai et al. |
| 4,295,502 A | | 10/1981 | Matzner |
| 4,338,218 A | | 7/1982 | Spinazzi |
| 4,393,538 A | | 7/1983 | Olson |
| 4,897,093 A | | 1/1990 | Thelin |
| 4,952,509 A | | 8/1990 | Wegner et al. |

(Continued)

*Primary Examiner* — Robert A Hopkins
(74) *Attorney, Agent, or Firm* — The Watson I.P. Group, PLC; Jovan N. Jovanovic; Vladen M. Vasiljevic

(57) ABSTRACT

A defoamer assembly for a filler comprising a containment tank, a extrusion forcing sub-assembly, a collection subassembly and an extruder subassembly. The extrusion forcing sub-assembly is associated with the containment tank. The extrusion forcing sub-assembly is structurally configured to force gas from within the containment tank through an opening. The collection subassembly is coupled to an inlet port on the containment tank, and includes a collection head with an inlet opening and a conduit coupling the collection head with the inlet port. The extruder subassembly is coupled to the inlet port. The first end of the extruder assembly receives foam from the collection assembly and an outlet comprising a mesh having a plurality of openings. The outlet is in fluid communication with the extrusion forcing sub-assembly. The extrusion forcing sub-assembly directs the foam through the mesh, thereby extruding the foam therethrough, to, in turn, separate at least a portion of the foam into a fluid and a gas.

16 Claims, 8 Drawing Sheets

(56) References Cited

U.S. PATENT DOCUMENTS 4,970,167 A    11/1990   Baugh et al.
5,038,548 A     8/1991   Sieg

* cited by examiner

DEFOAMER ASSEMBLY FOR USE WITH A FILLER AND METHOD THEREFOR

CROSS-REFERENCE TO RELATED APPLICATION

N/A

BACKGROUND OF THE DISCLOSURE

1. Field of the Disclosure

The disclosure relates in general to equipment for filling containers, and more particularly, to a defoamer assembly for use with a filler. The disclosure is additionally directed to a method of use of a defoamer assembly.

2. Background Art

The filling of bottles and the like with a flowable material is well known in the art. Typically, a filler is provided that includes a rotating filler bowl. The filler bowl includes a plurality of valves extending therefrom. As the filler bowl rotates, the valves are coupled to containers, and selectively activated to dispense flowable material from the filler bowl into the containers. The containers are sequentially fed into the filler, filled, capped and then removed from the filling equipment.

As the filler bowl rotates, and the valves are selectively actuated, the flowable material becomes agitated. In many instances (such as with milk or cranberry juice, for example), foam builds up within the filler bowl. Eventually, the foam extends over the top of the filler bowl and begins to run down the sides of the filler bowl. Continued operation results in the foam reaching the filler valves. This can lead to complications such as impediment to operation, damage to the filler or the containers to be filled and/or contamination, to name a few.

In many instances, the filler is shut down and the foam is cleaned from the filler. Problematically, a stoppage of the filler reduces efficiency and the output of the filler. In some instances once the filler is cleaned, the foam accumulates at a quicker rate. Problematically, over the course of a day, the filler can be stopped multiple times for cleaning. It is not uncommon to have a filler shut down every hour for cleaning due to the accumulation of foam.

SUMMARY OF THE DISCLOSURE

In one aspect, the disclosure is directed to a defoamer assembly for a filler. The defoamer comprises a containment tank, a extrusion forcing sub-assembly, a collection subassembly and an extruder subassembly. The containment tank defines a cavity and has a plurality of ports providing ingress into the cavity. The extrusion forcing sub-assembly is associated with the containment tank. The extrusion forcing sub-assembly is structurally configured to force gas from within the containment tank through a port in the containment tank The collection subassembly is coupled to an inlet port on the containment tank, and includes a collection head with an inlet opening and a conduit coupling the collection head with the inlet port.

The extruder subassembly has a first end coupled to the inlet port, and a second end extending therefrom. The first end of the extruder assembly defines an inlet configured to receive foam from the collection assembly. The extruder subassembly includes an outlet which comprises a mesh having a plurality of openings. The outlet is in fluid communication with the extrusion forcing sub-assembly. The extrusion forcing sub-assembly directs the foam through the mesh, thereby extruding the foam therethrough, to, in turn, separate at least a portion of the foam into a fluid and a gas.

In some configurations, the extruder subassembly further comprises at least one tubular member. The tubular member is coupled to the inlet port. The at least one tubular member further comprises at least one mesh section. The mesh section includes a first end and a second end, and an outer surface therebetween. At least a portion of the outer surface thereof defines the mesh.

In some configurations, the at least one tubular member comprises a generally cylindrical member, with substantially the entirety of the outer surface comprising the mesh.

In some configurations, the mesh includes substantially uniform openings therealong.

In some such configurations, the at least one tubular member includes at least two mesh sections. The at least two mesh sections positioned sequentially.

In some configurations, at least a portion of the at least one mesh section is positioned obliquely relative to a force of gravity. In some such configurations, a portion of the at least one mesh section is positioned at an angle of between 30° and 60° relative to the force of gravity.

In some configurations, the tubular member includes a second end. The second end of the tubular member comprises an opening that is positioned below a minimum fluid level within the containment tank.

In some configurations, the at least one tubular member comprises a first tubular member coupled to the inlet port, and a second tubular member coupled to a second inlet port of the containment tank.

In some configurations, the first tubular member and the second tubular member are substantially identical and positioned in a spaced apart, side by side orientation within the containment tank.

In some configurations, the extrusion forcing sub-assembly further includes a motor with an inlet coupled to the gas removal port of the containment tank and an outlet. The outlet directs gas from within the containment tank therethrough.

In some configurations, the evacuation forcing sub-assembly further includes a filter structurally configured to filter fluid and solids from within the containment tank.

In some configurations, the containment tank further includes a sump pump positioned within the containment tank, the sump pump coupled to an evacuation port on the containment tank.

In some configurations, the containment tank further includes a sump region. The sump pump is positioned within the sump region of the containment tank.

In some configurations, the containment tank further includes at least one cleaning fluid jet directed to at least a portion of the extruder subassembly within the containment tank.

In some configurations, the containment tank further includes at least one transparent window to provide visual access to the cavity of the containment tank.

In some configurations, the collection subassembly further includes at least two collection heads positionable in proximity with a filler bowl of a filler apparatus.

In some configurations, at least one of the at least two collection heads oriented substantially vertically overlying a portion of an upstanding wall of a filler bowl of a filler apparatus. Additionally, at least one of the at least two collection heads extend along an upper brim of an upstanding wall of a filler apparatus.

In some configurations, the collection subassembly further includes a fluid injection system structurally configured to provide a fluid to the foam within the collection subassembly.

In another aspect of the disclosure, the disclosure is directed to a method of defoaming a filler comprising: collecting foam from a filler proximate a filler bowl; directing the collected foam into an extruder subassembly; extruding the foam through the extruder subassembly, to, in turn, separate the foam into a fluid and a gas.

In some configurations, the extruder subassembly is positioned within a containment tank. The method further comprising the steps of exhausting the gas from within the containment tank after the step of extruding the foam; and collecting the fluid within the containment tank after the step of extruding the foam.

In some configurations, the extruder assembly has a second end. The method further comprises the step of: filling the containment tank to a level above the second end.

In some configurations, the containment tank further includes at least one cleaning fluid jet. The method further comprises the steps of actuating the cleaning fluid jet; and directing a fluid from the cleaning fluid jet onto the extruder assembly.

BRIEF DESCRIPTION OF THE DRAWINGS

The disclosure will now be described with reference to the drawings wherein.

DETAILED DESCRIPTION OF THE DISCLOSURE

Figure 1:
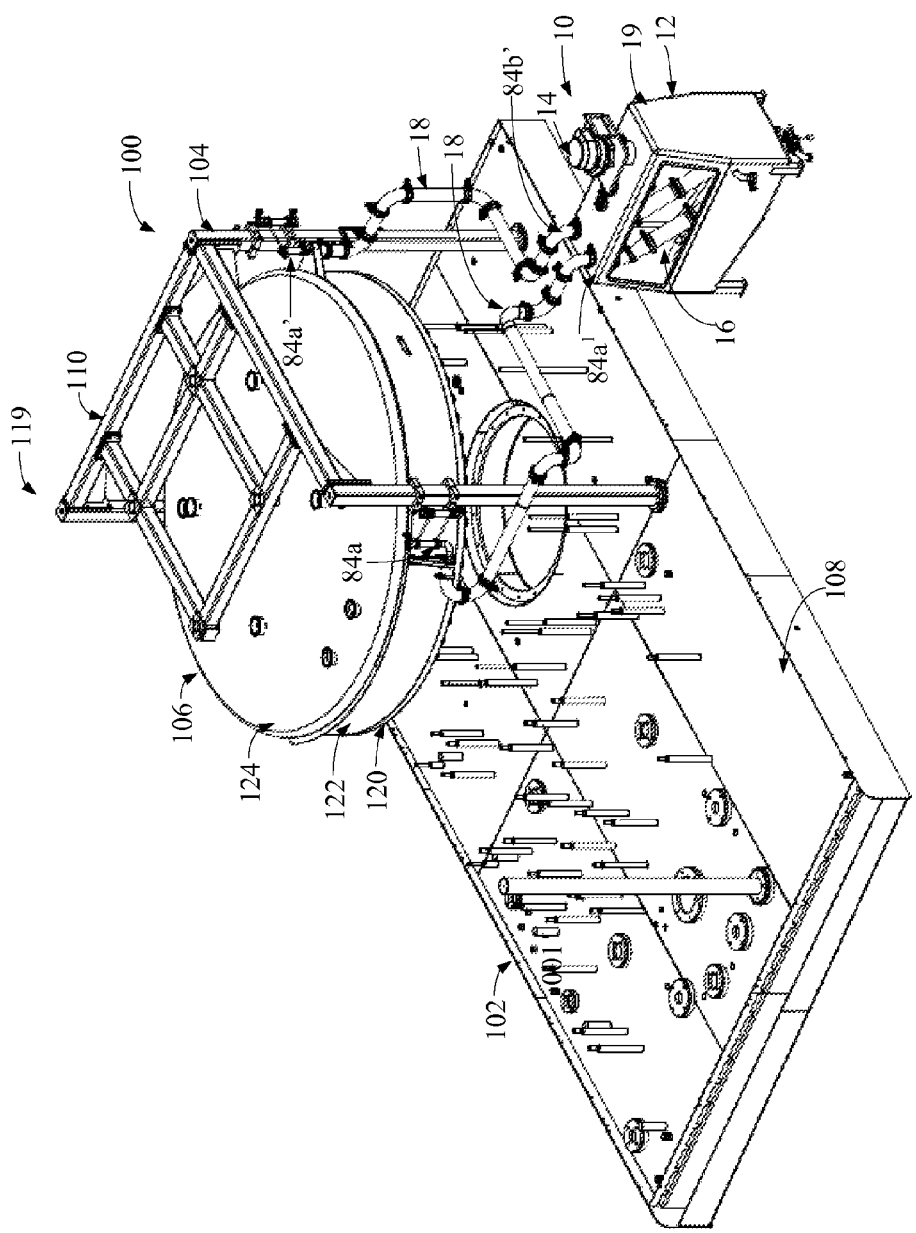
FIG. 1 of the drawings is a perspective view of a portion of a filler apparatus showing the defoamer assembly of the present disclosure coupled thereto and operating therewith.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the defoamer assembly is shown generally at 10. The defoamer 10 is shown as being associated with a filler, such as filler apparatus 100. It will be understood that defoamer 10 is configured to remove foam from a filler during, before, or after the filling process. The defoamer is not limited to use in association with any particular type or brand of filler. While a particular type of rotary filler is shown, with a rotating bowl having a particular configuration, such a depiction is merely illustrative and for purposes of disclosing the environment. Again, the defoamer is not limited to use in association with such a filler. The defoamer is also not limited to use in association with any particular type of flowable material. Indeed, the defoamer is configured for use in association with virtually any fluid that may be placed within the filler. For example, and certainly not limited thereto, the defoamer is configured for use in association with flowable material ranging from water to antifreeze, juice to household products, and pharmaceutical to dairy products.

For purposes of environment, filler apparatus 100 will be described with the understanding that such an explanation is for illustrative purposes, and that the defoamer is not limited to use in association with such a filler. The filler apparatus 100, (among other components) includes base 102, frame member 104 and filler bowl 106. Such a filler may comprise an F8 filler from Fogg Filler Company of Holland, Mich., the specification of which is hereby incorporated by reference, while not being limited to such a filler. For example, other fillers made by the same company or by other companies are contemplated for use in association with the filler apparatus 100.

The base includes an upper surface 108 and generally provides the base upon which the remaining components are coupled. The frame member 104 extends from and is coupled to the base. The frame member may include a plurality of beams 110 which may be arranged vertically, horizontally or obliquely to both the vertical and horizontal. The beams provide a stable platform upon which further components can be mounted.

Figure 2:
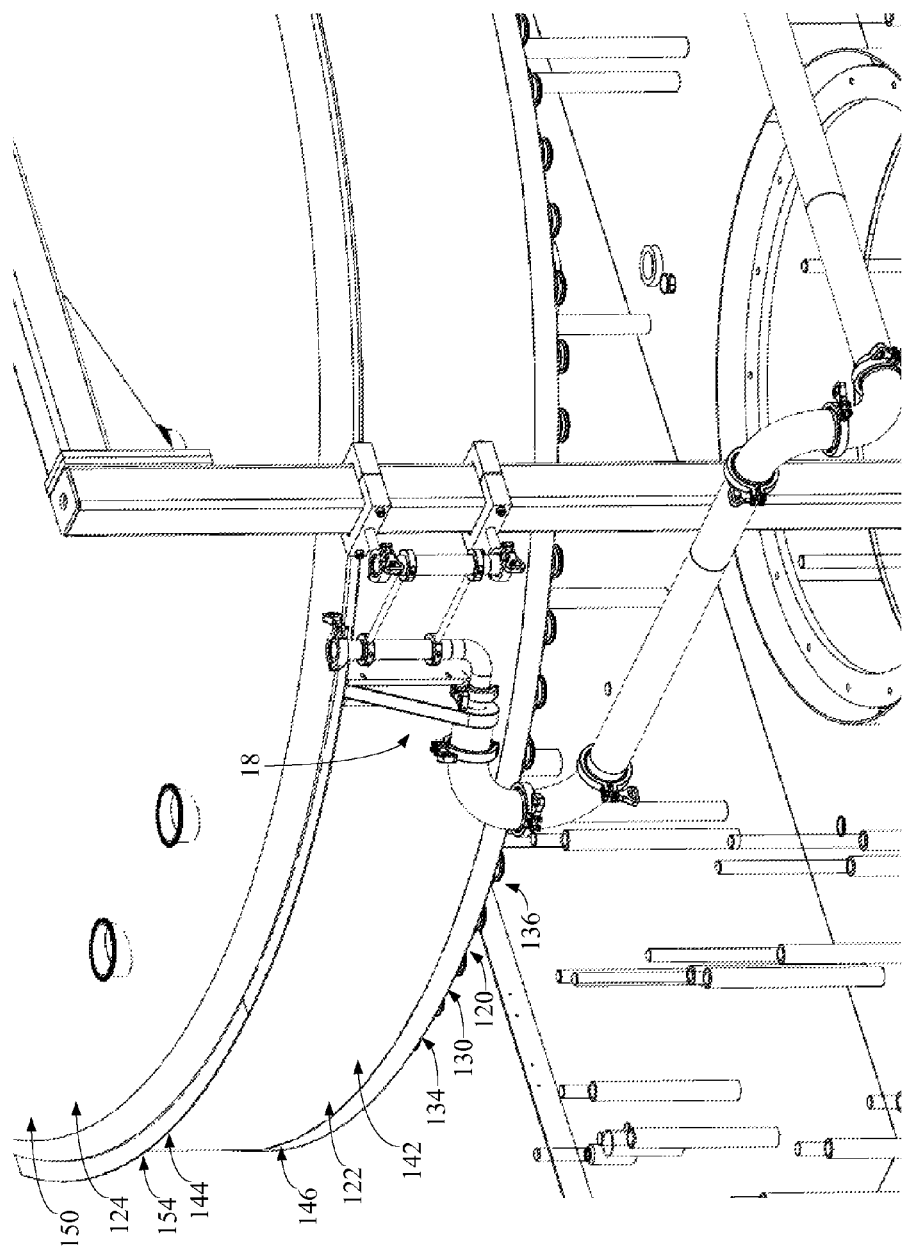
FIG. 2 of the drawings is a partial perspective view of a portion of a filler apparatus showing a portion of the collection subassembly, and in particular a collection head and its positioning relative to the filler apparatus, and in particular the filler bowl.
Figure 3:
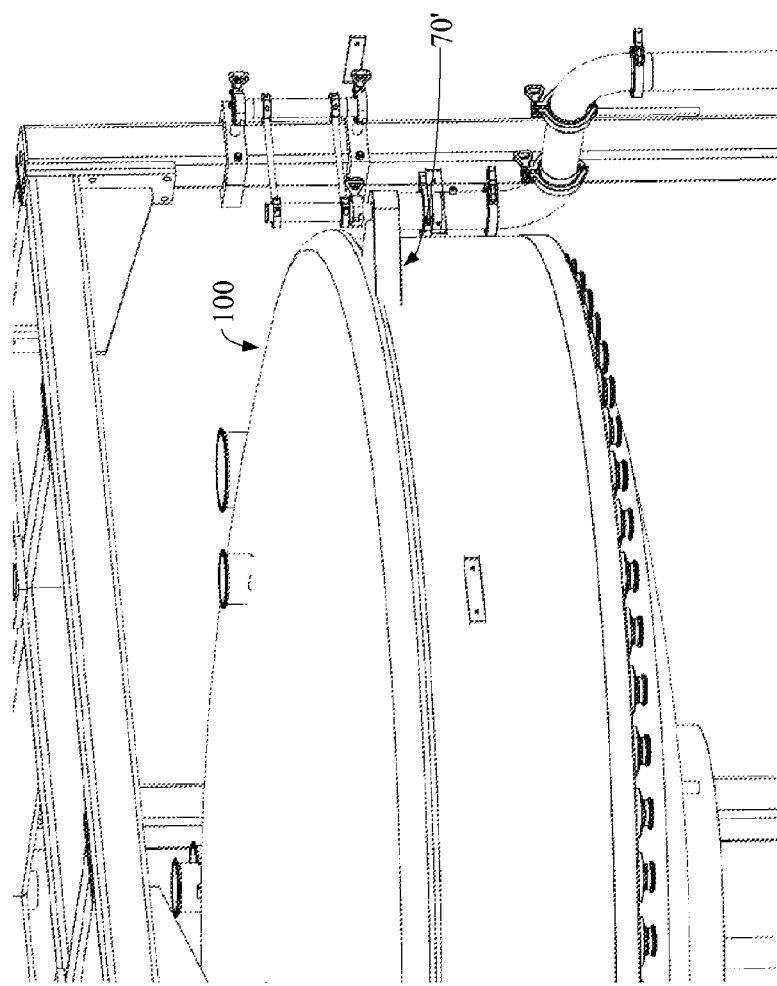
FIG. 3 of the drawings is a partial perspective view of a portion of a filler apparatus showing a portion of the collection subassembly, and in particular a collection head and its positioning relative to the filler apparatus, and in particular the upper brim of the filler bowl.
Figure 4:
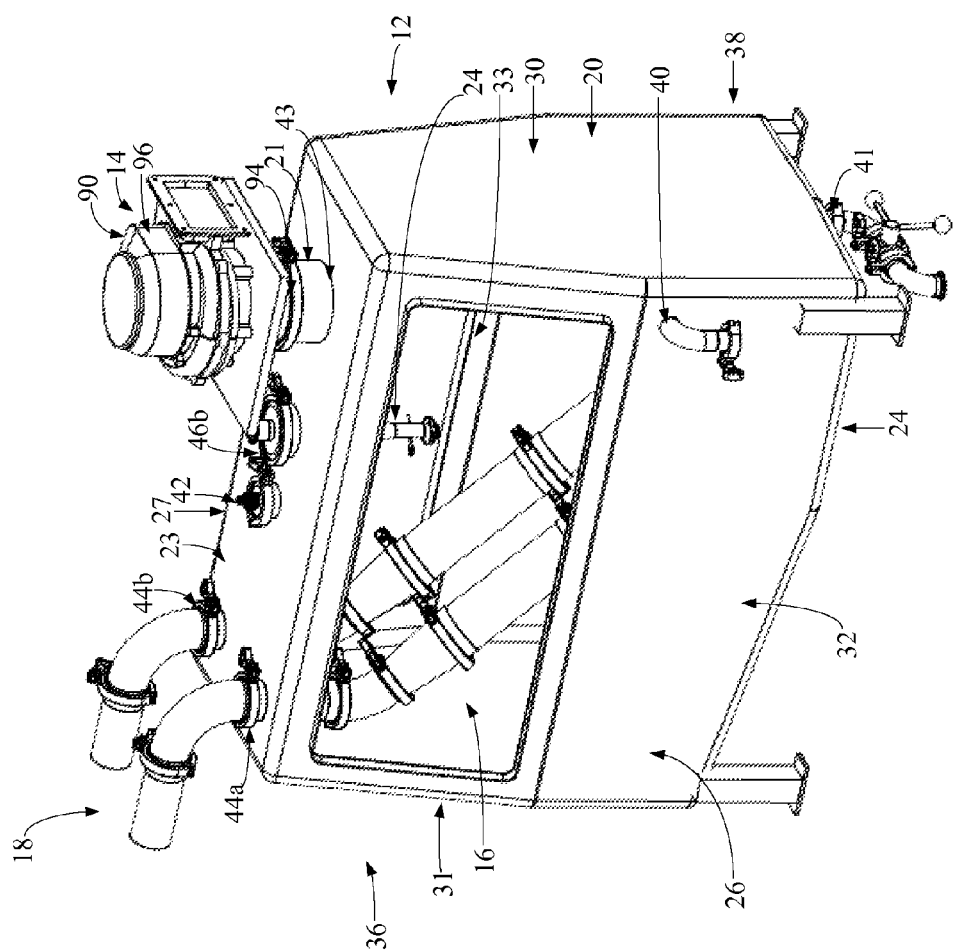
FIG. 4 of the drawings is a perspective view of a portion of the defoamer assembly.

With additional reference to FIGS. 2 and 3, in addition to FIG. 1, the filler bowl 106 is shown in FIG. 1 as generally including an axis 119 of rotation. The filler bowl 106 includes base 120, upstanding wall 122 and cover 124. It will be understood that the filler bowl 106 rotates relative to the base 102 and the frame member 104, typically about the axis 119 (which is typically substantially vertical). The base 120 of the filler bowl includes top surface (not shown), bottom surface 134 and a plurality of valve ports, such as valve port 136, all of which extend about the outer periphery 130. The number of and position of the plurality of valve ports can be varied depending on the filler. The base 120 is configured to direct fluid toward the valve ports. The valve ports, it will be understood, are configured to receive a valve member which is capable of selectively allowing fluid to exit from the filler bowl therethrough (and into a bottle or the like).

The upstanding wall 122 extends around the outer periphery 130 of the base 120. The upstanding wall 122 includes inner surface (not shown), outer surface 142, upper brim 144 and lower end 146. The lower end 146 meets the outer periphery 130 of the base 120. Typically, the upstanding wall 122 extends substantially vertically. In certain embodiments, the upstanding wall 122 may comprise a cylindrical member, whereas in other embodiments, the upstanding wall may be directed inwardly or outwardly relative to the lower end and the outer periphery of the base 130. The base and the upstanding wall cooperate to define a cavity which can be filled with a flowable material (such as a fluid), with the upper brim defining the opening to the cavity.

In some configurations, a cover may be employed, such as cover 124. The cover may rotate with the filler bowl, or may, in some embodiments, remain stationary. The cover 124 includes upper surface 150 and lower surface (not shown) 152, and outer rim 154. In the configuration shown, the outer rim 154 generally corresponds to the upper brim 144 of the upstanding wall. In some configurations the outer rim will extend beyond the upper brim, whereas in other configurations, the upper brim 144 will extend beyond the outer rim. It will be understood that an exit point for the foam from a filler is between the upper brim 144 and the outer rim 154 of the cover 124. Of course, in still other configurations, the cover may be fully eliminated.

With additional reference to FIGS. 4 through 7, the defoamer assembly 10 includes containment tank 12, extrusion forcing sub-assembly 14, extruder sub-assembly 16, collection sub-assembly 18 and electronic controller 19. The defoamer assembly 10 is shown as being positioned proximate the filler apparatus and coupled thereto. In other configurations, the defoamer assembly 10 may be incorporated and integral with the filler. For example, the defoamer containment tank 12 may be positioned on the base 102. In the configuration shown, the containment tank 12 is positioned proximate the base 102. It is contemplated that in some configurations, the containment tank may be provided with wheels or a cart to permit movement between different fillers, or stowage when not needed.

The containment tank 12 includes body 20, ports 21 and sump pump 22. The body 20 includes base wall 24, upright walls 26 and top wall 28. The upright walls 26 include, in the configuration shown, front 30, back 31, first side 32 and second side 33. The First and second sides 32, 33, may further include transparent portions, such as windows 34a, 34b. In other configurations, the transparent sections may be eliminated, or further transparent sections may be provided. The cross-sectional configuration of the containment tank is generally rectangular from the base wall to the top wall, however, certain of the upright walls may include portions that are oblique to the base wall and portions that are perpendicular to the base wall. It will be understood that the body 20 of the containment tank 12 defines sump region 38 and upper end 36. Of course, the containment tank is not limited to any particular configuration, and a number of different configurations are contemplated. More particularly, the containment tank shape is shown as being exemplary, and not to be deemed limiting.

The ports 21 include a plurality of openings that are spaced apart and provide access to, or the incorporation of, various components that will be described hereinbelow. Among other ports, the ports 21 include evacuation port 40, drain port 41, tank light port 42, gas removal port 43, inlet ports, such as inlet ports 44a, 44b and spray jet ports, such as spray jet ports 46a, 46b. Each of the ports will be discussed in greater detail below. In many instances, the ports will include a flange which is configured to interface with a commonly used sanitary, or tri clover clamp.

The evacuation port 40 is positioned on the first side 32 proximate the lower end thereof. The drain port 41 is positioned on the base wall proximate the sump region 38. The tank light port, the gas removal port and the inlet ports are all positioned on the top wall. The spray jet ports include two ports, one of which is positioned on the top wall and one of which is positioned on the back wall. It will be understood that the position of the ports may be varied and a number of different configurations are contemplated, based upon the different functions of the ports, and the structures to which the ports are coupled.

The sump pump 22 is positioned within the sump region 38 of the containment tank body 20. The sump pump comprises a conventionally known electric sump pump that includes a float or pressure switch that controls the actuation thereof (while it is further contemplated that the electronic controller may directly control the actuation of the sump pump through a number of different sensors). The sump pump includes inlet 47 configured to receive fluid that is within the containment tank, and outlet 48. The outlet 48 is coupled to the evacuation port 40. The two can be coupled through piping, and through the utilization of various clamps and the like to join the pipe sections.

In the configuration shown, cleaning fluid jets, such as cleaning fluid jet 24 can be coupled to the spray jet ports, such as spray jet port 46a. The spray jet ports are strategically positioned about the containment tank. The cleaning fluid jets 24 are generally configured to direct water or another fluid (such as a cleaning fluid) at various components within the containment tank. For example, in certain uses, the extruder subassembly may become clogged with pulp or other solids. The cleaning fluid jets direct fluid at a velocity and pressure generally at strategic locations along the extruder subassembly so as to generally drive the pulp and other solids toward the second end of the tubular member 60 of the extruder subassembly. The cleaning fluid jets likewise can spray fluid along other surfaces so as to essentially wash down the interior of the containment tank. It will be understood that while two cleaning fluid jets are shown, multiple cleaning jets could be employed.

A light 26 may be coupled to the tank light port 42 and so as to selectively provide illumination to the containment tank. In certain configurations, it may be desirable to illuminate the containment tank so as to view the inner workings through, for example, the transparent sections 34a, 34b. In other configurations, multiple lights may be employed throughout the containment tank to better illuminate the various components. The light may be helpful for diagnosing various faults in the operation, or to view certain operations (such as the operation of the cleaning fluid jets) and the like.

The extrusion forcing sub-assembly 14 includes motor 90 and filter 92. The motor includes inlet 94 and exhaust 96, and essentially comprises a vacuum or a suction force. The motor 90 is generally mounted so that the inlet 94 is coupled to the gas removal port 43. In the configuration shown, the motor is such that substantially the entirety of the motor rests on the gas removal port 43 and remains within the footprint of the top wall 28. Of course, variations are contemplated.

The filter 92 is positioned within the containment tank 12, or within the gas removal port 43. In other configurations, the filter 92 is located on the outside of the containment tank over the exhaust 96. Of course, in still other embodiments, depending on the fluid that is in the filler, and various other parameters, the filter can be entirely omitted. In still other configurations, the outlet may be directed to another containment unit, or may be vented to ambient, a filter system, outdoors, etc. Thus, a number of different configurations are contemplated. It is also contemplated that where a vacuum or suction is utilized, the vacuum source may be located distally from the containment tank, with a conduit or pipe extending therebetween (i.e., a remote vacuum source, or a central vacuum system, among others). The portability of the system, however, is typically enhanced with the motor mounted directly to the gas removal port.

It will further be understood that the function of the extrusion forcing sub-assembly is to create a pressure difference between the material that is entering through the inlet 52 and into inner chamber 50 and the tank on the opposite side of the outlet 54. As such, in some configurations, the extrusion forcing sub-assembly may comprise a vacuum or suction device that pulls foam and liquids outside of the containment tank and then blows or directs under pressure the foam (with other gas and liquid that is also taken in) through inlet 52 and through to the outlet 54. Indeed, such an operation would be analogous, as the pressure difference is created across the outlet 54 (the mesh) so that the flow is directed therethrough. It will be understood that the extrusion forcing sub-assembly provides a force such that flow is outward through the mesh. One such embodiment positions a blower/vacuum to pull in the foam and then to blow the foam to the inlet 52. Such a configuration would render a similar pressure difference (or flow direction) across the mesh to provide an appropriate level of passage of material thereacross.

Figure 5:
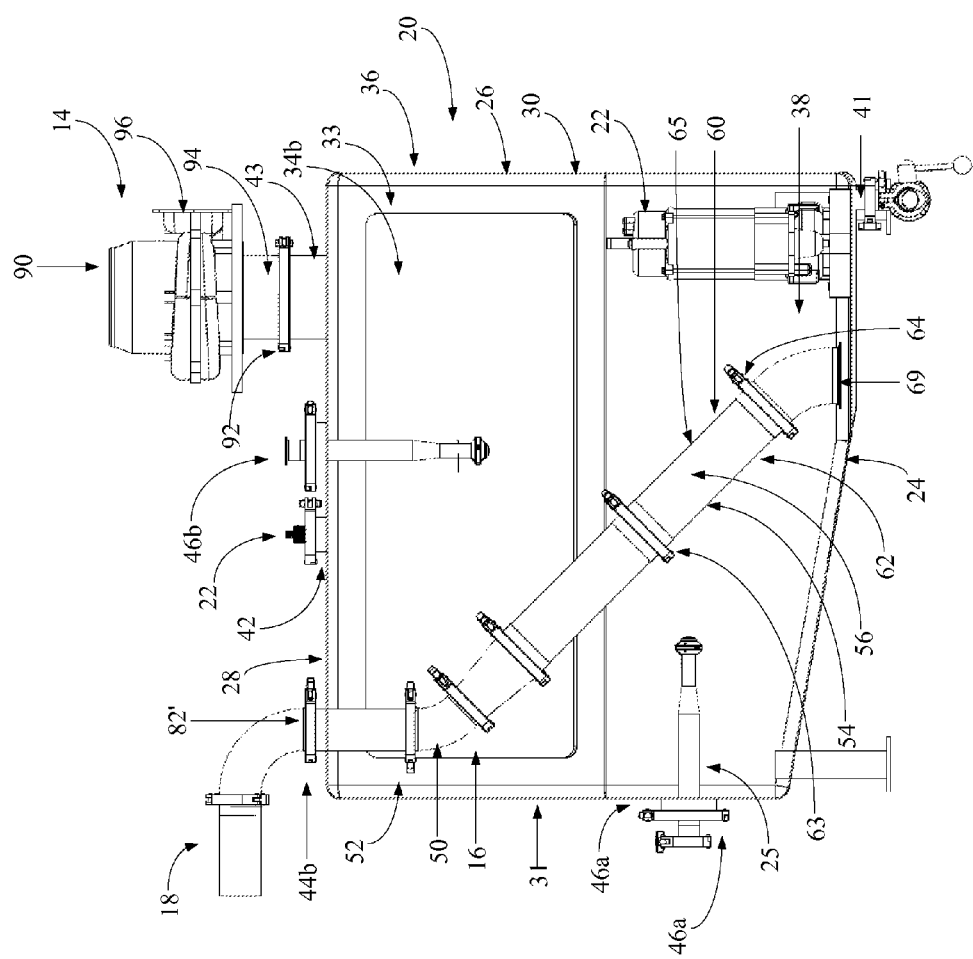
FIG. 5 of the drawings is a partial cross-sectional view of the defoamer assembly, showing, in particular, the containment tank, the extrusion forcing sub-assembly, and the extruder subassembly.
Figure 6:
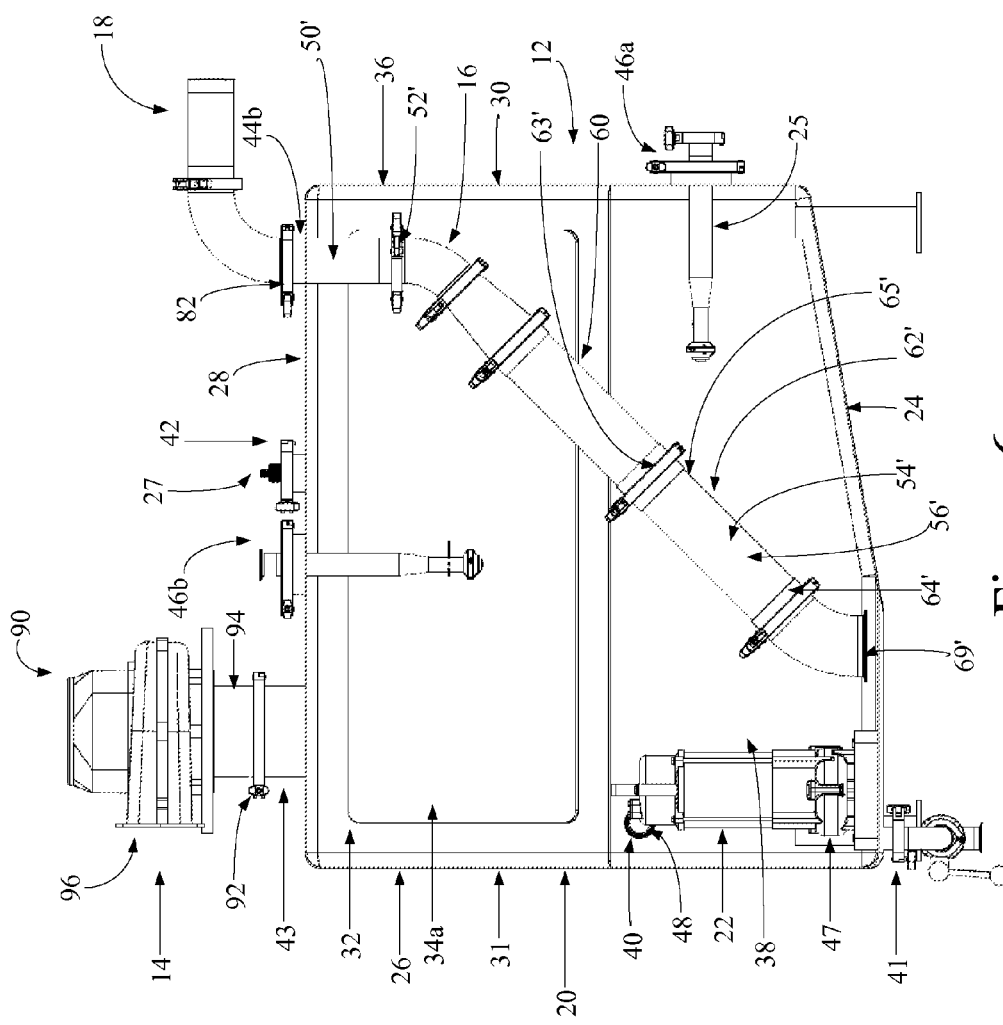
FIG. 6 of the drawings is a partial cross-sectional view of the defoamer assembly, showing, in particular, the containment tank, the extrusion forcing sub-assembly, and the extruder subassembly.
Figure 7:
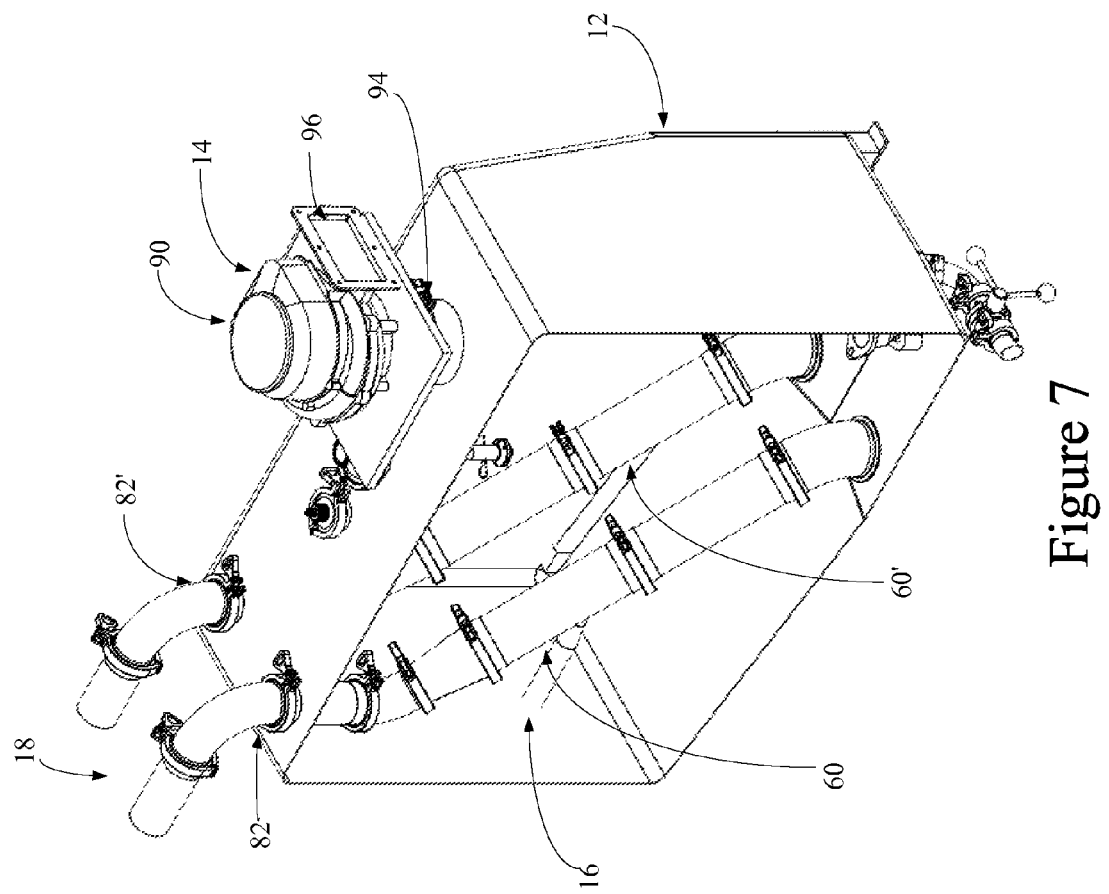
FIG. 7 of the drawings is a perspective partial cross-sectional view of the defoamer assembly, showing, in particular, the containment tank, the extrusion forcing sub-assembly, and the extruder subassembly.
Figure 9:
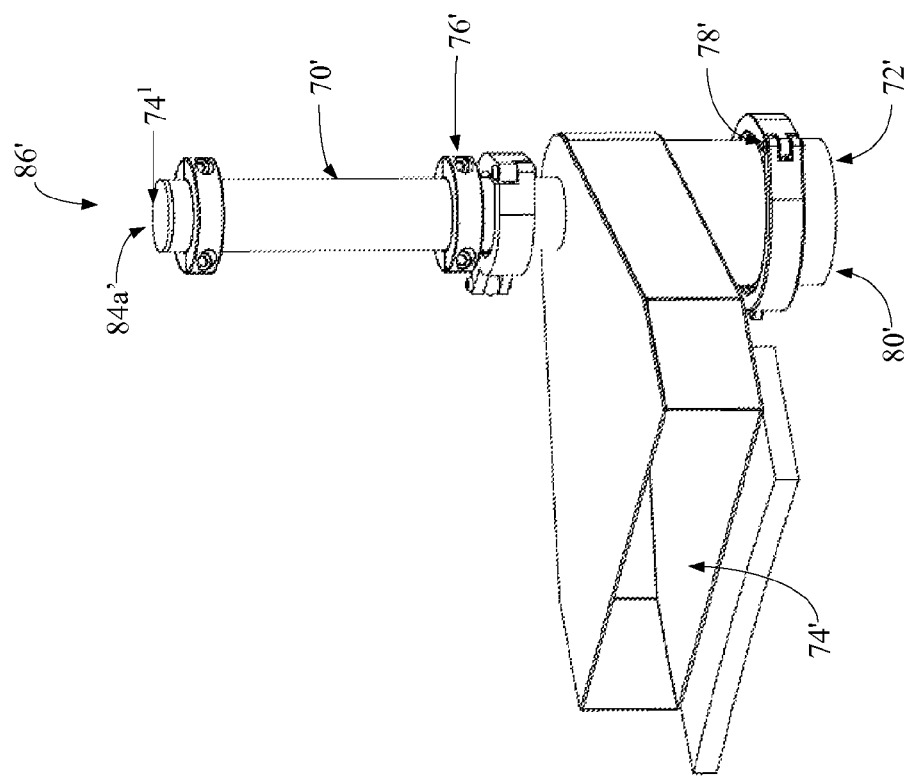
FIG. 9 of the drawings is a perspective view of a portion of the collection subassembly, showing, in particular, a collection head, a portion of the conduit and the fluid injection system, with the inlet opening oriented in a horizontal direction.
Figure 8:
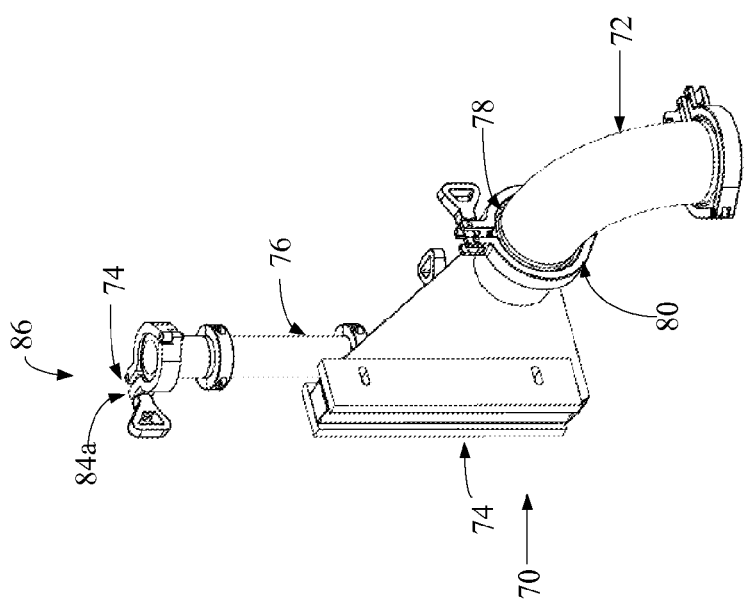
FIG. 8 of the drawings is a perspective view of a portion of the collection subassembly, showing, in particular, a collection head, a portion of the conduit and the fluid injection system, with the inlet opening oriented in a vertical direction.

The extruder subassembly 16 is shown in FIGS. 5 through 7 as comprising inner chamber 50, inlet 52, and outlet 54. The inner chamber 50 defines a volume which, as will be explained is configured to receive fluid in from inlet 52. The outlet 54 generally comprises a mesh member 56 which includes a plurality of openings, which, in turn, allows the extrusion of bubbles and foam therethrough effectively breaking down the foam into its constituent fluid and gas components. One exemplary mesh comprises wire cloth that is a 20×20 mesh (of a stainless steel, such as a 316 stainless steel, for example) that has a opening size of 0.027", a 29% open area made from a wire diameter of 0.023". Of course, other materials and other dimensions for the mesh are contemplated, however, it has been found that such a mesh provides exemplary results. As will be explained below, the gas components are generally directed through the mesh in generally an upward direction toward the gas removal port, with the liquid being driven downwardly by gravity. A number of different mesh sizes are contemplated, and the mesh size as well as the air volume to be evacuated can be varied to achieve the desired extrusion of the bubbles, without sputtering and creation of additional bubbles at the outlet 54.

In the configuration shown, the extruder subassembly includes one or more tubular members 60. In the configuration shown, there are two separate tubular members 60, 60' in a parallel and spaced apart configuration, both of which will include the same reference numbering, with the tubular member components being augmented by a prime ('). Each tubular member is coupled at the first end (the inlet) to the inlet port 44a, 44b, respectively and further includes a second end, which in the configuration shown, is generally directed downward and positioned proximate the base wall 24. It will be explained below that it is typically desirable to one of restrict the second end (i.e., cap the second end) or to have the second end below the standing water line of the containment tank to preclude the passage of air therethrough.

Each tubular member includes a tubular mesh section 62. In the configuration shown, each tubular member 60 includes a pair of tubular mesh sections. The tubular mesh sections each comprise a first end 63, a second end 64 and an outer surface 65. While a single mesh section or a full mesh area can be defined, such a configuration allows for easy swapping of sections, ease of clean-up, ease of assembly and disassembly and minimization of different parts for inventory. In the configuration shown, the first and second ends are configured to be utilized with sanitary clamps, with the outer surface 65 defining a generally cylindrical configuration. In the configuration shown, the entire surface area of the outer surface 65 comprises a substantially uniform mesh member. Of course, other variations are contemplated, including other shapes for the mesh surface, as well as other configurations of the overall mesh member. It has been found that such a configuration as is shown, includes enough surface area to achieve the desired defoaming under a number of different conditions, and a number of different fluids.

Each tubular mesh section 62 is inclined such that a portion of the tubular mesh section is oblique or perpendicular to the force exerted by gravity. It has been found that an oblique angular positioning of approximately 30° to 60° yields improved performance, as a preferred balance of bubble/foam contact with the mesh can be achieved. It is however, contemplated that where there are size restraints or other design criteria, vertical mesh members as well as mesh members at different angles are likewise contemplated. In the configuration shown, four total tubular mesh sections are utilized, two for each one of the tubular members. In other embodiments, a greater or fewer number of tubular mesh sections can be utilized.

In the configuration shown, it is described that the second end 69 of the tubular member is open, however, that it is preferably positioned below the standing fluid level. It is preferred that the bubbles are extruded so that the air (or other gas) is directed through the mesh, and preferably does not reach the second end. The level of fluid being above the second end of the tubular member generally precludes the passage of gas therethrough. In other embodiments, the second end can be fully shut off or closed. Advantageously, by placing the second end below the standing fluid level, while being open, any pulp or other solids that are too large for the mesh are generally washed down by the water toward the second end and passed into the liquid. As such, the tubular members are less likely to accumulate solids, such as pulp or the like, during operation. It is contemplated that a solids collection basket or the like can be positioned proximate the second end to capture solids that have entered the containment tank. In the configuration shown, a final downwardly directed outlet provides an opening that is generally perpendicular to the force of gravity and one that will generally be parallel with the fluid level within the containment tank.

The collection subassembly 18 is shown in FIG. 1 and portions thereof are shown in FIGS. 2, 3, 4 7 and 8 as including a plurality of collection heads, such as collection head 70, conduit 72 and fluid injection system 74. It will be understood that multiple collection heads may be utilized depending on the different configurations of the filler. It will be understood that the size of the filler bowl, the quantity of foam/bubbles that are generated, the strength of the suction or pull and the placement of the collection head vis-à-vis the filler bowl are all considerations, among other considerations, for the quantity, size and placement of the collection head(s).

The collection head 70 includes inlet opening 74, fluid injection opening 76 and outlet 78. In the configuration shown, the inlet opening comprises a generally rectangular opening that has a length that is substantially larger than the width. In the configuration shown, the opening has a length that is similar to the height of the upstand portion of the filler bowl. The width of the same is generally substantially narrower. The length is positioned generally vertically and generally parallel to the axis of rotation, in a spaced apart manner from the upstand portion. It will be understood, and explained below that the suction force is sufficient so that substantially any liquid or foam that is on the upstand portion will be sucked into the inlet opening 74 of the collection head 70.

The outlet 78 comprises a standard size conduit with a flange end that is configured to mate with another flange, and which is then secured by a sanitary clamp (with appropriate gaskets and the like). The conduit 72 couples to the outlet 78 at first end 80 thereof, with the second end 82 being coupled to the inlet port 44a. It will be understood that the conduit may comprise a number of segments that may be coupled with sanitary clamps. Indeed, the disclosure is not limited to utilizing any particular configuration for the conduit, or to have any particular number of flanges, elbows and segments or the like. The conduit 72 provides a substantially fluid tight configuration for the travel of the foam sucked from the filler apparatus to be directed to the containment tank.

It will be understood that it is desirable to maintain the foam in a hydrated state, or to further hydrate the foam. To achieve the same the fluid injection system 74 is configured to maintain a sufficient level of fluid within the conduit 72 to preclude the foam from drying out. It has been found that if the fluid content of the foam becomes too low, the foam may begin to clog the conduit prior to entry into the containment tank. The fluid injection system 74 precludes the same from occurring.

The fluid injection system 74 includes a plurality of atomizers, such as atomizer 84a and 84b. Atomizer 84a is coupled to the fluid injection opening 76 of the collection head. In other configurations, the atomizer may be coupled to the conduit proximate the first end thereof, or between the first and second ends. A fluid supply line 86 services the atomizer with the necessary fluid supply (often and typically water). A second atomizer 84b is positioned between the first and second ends of the conduit, or at the second end of the conduit. In other configurations, the second atomizer 84b may be coupled to the tubular member 60 of the extruder subassembly 16 prior to the tubular mesh sections. The electronic controller 19 may provide the necessary direction to the supply of fluid so that the atomizers perform and emit fluid at a desired rate and at a desired quantity or pressure. It will be understood that the flow rate of any of the atomizers, and the number of atomizers (which may exceed two), as well as the placement thereof may be varied depending on a number of different considerations.

In the configuration shown, a second collection head 70' is positioned in a spaced apart manner from the collection head 70. In particular, whereas collection head 70 has an inlet opening 74 of a rectangular cross-section with the length thereof being substantially vertical, the second collection head 70' includes an inlet opening 74' that is also of a substantially rectangular cross-sectional configuration. However, in the case of the second collection head, the length of the rectangular cross-sectional opening is positioned substantially horizontally proximate the upper brim 144 of the upstanding wall (or proximate the space between the outer rim 154 of cover 124 and the upper brim 144). It will be understood that in other configurations, the collection head may extend into the cavity of the bowl or overlie a portion of the cavity of the bowl.

A second conduit 72' extends between the second collection head 70' to the inlet port 44b. A second set of atomizers 84a' and 84b' direct fluid (typically water) into the flow of the second conduit 72'. In particular, the atomizer 84a' is positioned within the fluid injection opening 76', whereas the atomizer 84b' is positioned proximate the second end 82' of the conduit 72'. Of course, as with the atomizers 84a, 84b, the position of the same may be varied depending on the different configurations.

With reference to FIG. 1, the electronic controller 19 may comprise a general purpose computer (or a specific computing device) which may be configured to interface with the controller of the filler and which can control the different aspects of the present disclosure. For example, the electronic controller 19 may control the sump pump of the containment tank, the actuation of the atomizers, the actuation of the motor of the extrusion forcing sub-assembly, as well as the light, and the cleaning jets. It will be understood that the electronic controller may be a stand alone controller that is separate from the filler, or may integrate with the controller of the filler. Such controllers are known in the art. In other configurations, each of the components may be manually controlled, or the control may be a cooperative system, a portion of which is manual and a portion of which is controlled by an electronic controller.

In operation, the defoamer assembly 10 is coupled to a filler, such as filler 100. In the configuration shown, the collection subassembly 18 includes a pair of collection heads 70, 70'. In other configurations, a single collection head may be employed. It will further be understood that for other operations (especially with flowable material that generates a substantial amount of foam, or with fillers having a relatively larger filler bowl) more than two collection heads may be required. In the configuration shown, the first collection head is positioned substantially vertically so as to follow the contours of the upstanding wall 122 of the filler bowl 106. The conduit 72 couples the outlet 78 of the collection head 70' to the inlet port 44a of the containment tank. A number of different conduit members along with gaskets and clamps may be employed. A pair of atomizers are coupled to the collection head and the conduit so as to provide fluid into the stream of foam gas and/or fluid collected by the collection head 70.

Similarly, collection head 70' is associated with the filler bowl. In the configuration shown, the collection head 70' has its inlet extending along the upper brim 144 of the filler bowl 106. The conduit 72' extends from the collection head 70' to the inlet port 46b. Atomizers are coupled to the collection head 70' and/or conduit 72' to provide fluid to the stream of foam, fluid and/or gas that is collected through collection head 70'.

It will be understood that the configuration is such that a large portion of the foam, fluid and/or gas exiting from the filler bowl is captured by the collection head 70' with any portions that manage to exit at a location that is spaced apart from the collection head 70' will, through the force of gravity, be directed along the outer surface of the upstanding wall of the filler bowl and collected by the collection head 70, thus minimizing (and in many configurations eliminating) any of such foam, fluid and/or gas to drip from the filler bowl or to otherwise contaminate the filler beyond the outer surface of the filler bowl.

With the collection subassembly configured, the containment tank can likewise be configured. In many instances, a single containment tank may be provided for a number of fillers, and moved from filler to filler, depending on the flowable material that is to be filled by the filler.

In addition to coupling the collection sub-assembly to the containment tank, other structures are coupled thereto. For example, the motor of the extrusion forcing sub-assembly is coupled to the gas removal port 43. A dedicated drain may be coupled to the evacuation port 40. In other embodiments, the evacuation port 40 may be positioned over a drain or the like. A light may be coupled to the tank light port 42. Cleaning fluid jets may be coupled to the spray jet ports 46a, 46b. Finally, the electronic controller may be interfaced with the foregoing components and to the filler as desired.

Generally, the system is activated through a series of steps. For example, an initial sequence may be that the cleaning fluid jets 24 actuate to clean any solids from the extruder subassembly 16, and, in the configuration shown, to provide an initial level of fluid within the containment tank. As set forth above, in the configuration wherein the second end of the tubular members of the extruder subassembly are open, it is preferable to have an initial fluid level within the containment tank that extends above the second ends. Such a configuration provides sufficient resistance to the flow from the collection subassembly so as to direct the air through the outlet 54 of the extruder subassembly instead of the second end. Where the second end is closed, or restricted in another manner, such an initial level of fluid can be utilized or the containment tank may start in the empty configuration.

Once the desired level of fluid within the containment chamber is reached (which can be reached through the use of the atomizers in the place of the cleaning fluid jets, or collectively therewith), the extrusion forcing sub-assembly can be activated. In particular, the motor can be activated so as to pull a suction force at the collection heads 70, 70'. At the same time, the atomizers are activated to provide fluid within the collection subassembly at the desired rate.

Once these subassemblies have been activated, the filler can begin operation. As the filler is operating, a number of different flowable material will generate foam, to an extent that the foam extends beyond the upper brim 144. Such foam (which may include foam, gas and fluid) is collected by the suction force of one of the collection heads at a respective inlet opening thereof. Once collected, the foam is further hydrated by the fluid injection system 74. The hydrated foam eventually exits from the conduit 72 and is directed into the extruder subassembly.

At the extruder subassembly, the foam and fluid enters into the inner chamber 50. The suction force within the containment tank directs the foam and the fluids from within the inner chamber through the outlet (the mesh openings). Essentially, such a directing or forcing through the mesh openings extrudes and essentially separates the fluid from the gas, with the gas escaping into the containment tank through the openings, and the fluid gathering about the outer surface of the tubular member, and falling through gravity toward the bottom of the tank. The flowable material collects within the containment tank, while the gas is pulled by the extrusion forcing sub-assembly and exhausted through the exhaust 96. Any particulates and the like within the gas are typically captured by filter 92.

Continued operation eventually collects an amount of fluid that is greater than the amount of fluid that is desirable. Once the fluid level reaches a certain level (or after a predetermined period of time), the sump pump 22 is activated and the fluid is directed through the sump pump to the evacuation port 40 and drained out of the system.

Such a system can operate continuously, as it is generally configured to handle a quantity of foam that is substantially greater than the foam typically generated by the filler in steady state operation. In other embodiments, the filler may have to be stopped every so often to service the defoamer assembly.

Once the user has completed use of the filler and the defoamer assembly, the filler is stopped, with the defoamer assembly continuing to operate. Eventually, the atomizers are stopped and the extrusion forcing sub-assembly ceases operation. The sump pump can be run to reduce the level of fluid within the containment tank. Finally, the drain port may be opened to remove any remaining fluid from within the containment tank. In some configurations, the cleaning fluid jets can be selectively activated to provide for additional cleaning. The cleaning fluid can be removed by the sump pump or through the drain port.

It will be understood that flow rate through the extrusion forcing sub-assembly as well as the fluid level within the containment tank, as well as the quantity of fluid injected by the atomizers can be varied so that the extruder subassembly extrudes the foam separating the same into gas and liquid constituents. It will be understood that at an excess suction force or pushing force can generate bubbles at the extruder subassembly. Additionally, a loss of hydration in the foam can cause the collection subassembly to collect foam and begin to clog. Thus, in some configurations with differing flowable material, the operator may make tweaks to the different parameters to achieve the proper operation of the extruder subassembly so as to effectively separate the gas from the fluid and solids, so that the fluid can be collected within the containment tank and so that the gas can be exhausted through the exhaust of the motor of the extrusion forcing sub-assembly.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A defoamer assembly for a filler comprising:

a containment tank, the containment tank defining a cavity and having a plurality of ports providing ingress into the cavity;

a extrusion forcing sub-assembly, the extrusion forcing sub-assembly associated with the containment tank, the extrusion forcing sub-assembly structurally configured to force gas from within the containment tank through a port;

a collection subassembly, the collection subassembly coupled to an inlet port on the containment tank, the collection subassembly including a collection head with an inlet opening and a conduit coupling the collection head with the inlet port; and an extruder subassembly, the extruder subassembly having a first end coupled to the inlet port, and a second end extending therefrom, the first end of the extruder subassembly defining an inlet configured to receive foam from the collection subassembly, the extruder subassembly including an outlet, the outlet comprising a mesh having a plurality of openings, with the outlet being in fluid communication with the extrusion forcing sub-assembly, wherein the extrusion forcing sub-assembly directs the foam through the mesh, thereby extruding the foam therethrough, to, in turn, separate at least a portion of the foam into a fluid and a gas, wherein the extruder subassembly further comprises at least one tubular member, the tubular member coupled to the inlet port, the at least one tubular member further comprising at least one mesh section, the mesh section including a first end and a second end, and an outer surface therebetween, at least a portion of the outer surface thereof defining the mesh, and wherein at least a portion of the at least one mesh section is positioned obliquely relative to a force of gravity.

2. The defoamer assembly of claim 1 wherein the at least one tubular member comprises a generally cylindrical member, with substantially the entirety of the outer surface comprising the mesh.

3. The defoamer assembly of claim 2 wherein the mesh includes substantially uniform openings therealong.

4. The defoamer assembly of claim 1 wherein the at least one tubular member includes at least two mesh sections, the at least two mesh sections positioned sequentially.

5. The defoamer assembly of claim 1 wherein a portion of the at least one mesh section is positioned at an angle of between 30° and 60° relative to the force of gravity.

6. The defoamer assembly of claim 1 wherein the at least one tubular member comprises a first tubular member coupled to the inlet port, and a second tubular member coupled to a second inlet port of the containment tank.

7. The defoamer assembly of claim 6 wherein the first tubular member and the second tubular member are substantially identical and positioned in a spaced apart, side by side orientation within the containment tank.

8. The defoamer assembly of claim 1 wherein the extrusion forcing sub-assembly further includes a motor with an inlet coupled to the gas removal port of the containment tank and an outlet, the outlet directing gas from within the containment tank therethrough.

9. The defoamer assembly of claim 8 wherein the extrusion forcing sub-assembly further includes a filter structurally configured to filter fluid and solids from within the containment tank.

10. The defoamer assembly of claim 1 wherein the containment tank further includes a sump pump positioned within the containment tank, the sump pump coupled to an evacuation port on the containment tank.

11. The defoamer assembly of claim 10 wherein the containment tank further includes a sump region, with the sump pump positioned within the sump region of the containment tank.

12. The defoamer assembly of claim 1 wherein the containment tank further includes at least one transparent window to provide visual access to the cavity of the containment tank.

13. A defoamer assembly for a filler comprising:
a containment tank, the containment tank defining a cavity and having a plurality of ports providing ingress into the cavity;
a extrusion forcing sub-assembly, the extrusion forcing sub-assembly associated with the containment tank, the extrusion forcing sub-assembly structurally configured to force gas from within the containment tank through a port;
a collection subassembly, the collection subassembly coupled to an inlet port on the containment tank, the collection subassembly including a collection head with an inlet opening and a conduit coupling the collection head with the inlet port; and
an extruder subassembly, the extruder subassembly having a first end coupled to the inlet port, and a second end extending therefrom, the first end of the extruder subassembly defining an inlet configured to receive foam from the collection subassembly, the extruder subassembly including an outlet, the outlet comprising a mesh having a plurality of openings, with the outlet being in fluid communication with the extrusion forcing sub-assembly, wherein the extrusion forcing sub-assembly directs the foam through the mesh, thereby extruding the foam therethrough, to, in turn, separate at least a portion of the foam into a fluid and a gas,
wherein the extruder subassembly further comprises at least one tubular member, the tubular member coupled to the inlet port, the at least one tubular member further comprising at least one mesh section, the mesh section including a first end and a second end, and an outer surface therebetween, at least a portion of the outer surface thereof defining the mesh, and
wherein the tubular member includes a second end, the second end of the tubular member comprising an opening that is positioned below a minimum fluid level within the containment tank.

14. A defoamer assembly for a filler comprising:
a containment tank, the containment tank defining a cavity and having a plurality of ports providing ingress into the cavity;
a extrusion forcing sub-assembly, the extrusion forcing sub-assembly associated with the containment tank, the extrusion forcing sub-assembly structurally configured to force gas from within the containment tank through a port;
a collection subassembly, the collection subassembly coupled to an inlet port on the containment tank, the collection subassembly including a collection head with an inlet opening and a conduit coupling the collection head with the inlet port; and
an extruder subassembly, the extruder subassembly having a first end coupled to the inlet port, and a second end extending therefrom, the first end of the extruder subassembly defining an inlet configured to receive foam from the collection subassembly, the extruder subassembly including an outlet, the outlet comprising a mesh having a plurality of openings, with the outlet being in fluid communication with the extrusion forcing sub-assembly, wherein the extrusion forcing sub-assembly directs the foam through the mesh, thereby extruding the foam therethrough, to, in turn, separate at least a portion of the foam into a fluid and a gas,
wherein the containment tank further includes at least one cleaning fluid jet directed to at least a portion of the extruder subassembly within the containment tank.

15. A defoamer assembly for a filler comprising:
a containment tank, the containment tank defining a cavity and having a plurality of ports providing ingress into the cavity;
a extrusion forcing sub-assembly, the extrusion forcing sub-assembly associated with the containment tank, the extrusion forcing sub-assembly structurally configured to force gas from within the containment tank through a port;

a collection subassembly, the collection subassembly coupled to an inlet port on the containment tank, the collection subassembly including a collection head with an inlet opening and a conduit coupling the collection head with the inlet port; and an extruder subassembly, the extruder subassembly having a first end coupled to the inlet port, and a second end extending therefrom, the first end of the extruder subassembly defining an inlet configured to receive foam from the collection subassembly, the extruder subassembly including an outlet, the outlet comprising a mesh having a plurality of openings, with the outlet being in fluid communication with the extrusion forcing sub-assembly, wherein the extrusion forcing sub-assembly directs the foam through the mesh, thereby extruding the foam therethrough, to, in turn, separate at least a portion of the foam into a fluid and a gas, wherein the collection subassembly further includes at least two collection heads positionable in proximity with a filler bowl of a filler apparatus, and wherein at least one of the at least two collection heads oriented substantially vertically overlying a portion of a upstanding wall of a filler bowl of a filler apparatus and at least one of the at least two collection heads extending along an upper brim of an upstanding wall of a filler apparatus.

16. A defoamer assembly for a filler comprising:
a containment tank, the containment tank defining a cavity and having a plurality of ports providing ingress into the cavity;

a extrusion forcing sub-assembly, the extrusion forcing sub-assembly associated with the containment tank, the extrusion forcing sub-assembly structurally configured to force gas from within the containment tank through a port;

a collection subassembly, the collection subassembly coupled to an inlet port on the containment tank, the collection subassembly including a collection head with an inlet opening and a conduit coupling the collection head with the inlet port; and an extruder subassembly, the extruder subassembly having a first end coupled to the inlet port, and a second end extending therefrom, the first end of the extruder subassembly defining an inlet configured to receive foam from the collection subassembly, the extruder subassembly including an outlet, the outlet comprising a mesh having a plurality of openings, with the outlet being in fluid communication with the extrusion forcing sub-assembly, wherein the extrusion forcing sub-assembly directs the foam through the mesh, thereby extruding the foam therethrough, to, in turn, separate at least a portion of the foam into a fluid and a gas, wherein the collection subassembly further includes a fluid injection system structurally configured to provide a fluid to the foam within the collection subassembly.

* * * * *